United States Patent [19]

Messenger

[11] 3,788,406

[45] Jan. 29, 1974

[54] LOST CIRCULATION CONTROL
[75] Inventor: Joseph U. Messenger, Dallas, Tex.
[73] Assignee: Mobil Oil Corporation, New York, N.Y.
[22] Filed: Dec. 27, 1971
[21] Appl. No.: 212,719

[52] U.S. Cl.............. 175/72, 166/294, 252/8.5 P, 252/8.5 LC
[51] Int. Cl............................................. E21b 21/04
[58] Field of Search..... 166/294; 175/72; 252/8.5 P, 252/8.5 LC

[56] References Cited
UNITED STATES PATENTS

| | | | |
|---|---|---|---|
| 3,718,585 | 2/1973 | Lummus et al. | 175/72 |
| 3,723,311 | 3/1973 | Lummus et al. | 252/8.5 P |
| 3,724,565 | 4/1973 | Kelly, Jr. | 175/72 |
| 3,740,360 | 6/1973 | Nimerick | 175/72 |
| 2,380,156 | 7/1945 | Dobson et al. | 175/72 |
| 2,661,334 | 1/1953 | Lummus | 252/8.5 P |
| 2,800,449 | 7/1957 | Browning | 252/8.5 P |
| 2,747,839 | 5/1956 | Moore | 175/72 |
| 3,658,701 | 4/1972 | Baggett et al. | 252/8.5 P |
| 3,642,623 | 2/1972 | Bennett et al. | 252/8.5 P |
| 3,668,129 | 6/1972 | Willett | 252/8.5 P |

*Primary Examiner*—Marvin A. Champion
*Assistant Examiner*—Jack E. Ebel
*Attorney, Agent, or Firm*—Andrew L. Gaboriault et al.

[57] ABSTRACT

This specification discloses a method of controlling the loss of drilling fluid into subterranean formations penetrated in the drilling of a well. An aqueous mixture comprising an emulsifying agent and preferentially oil-wettable granular particles in an amount greater than 100 pounds per barrel of mixture is introduced into the well. This aqueous mixture is circulated down the well and into the formation into which the drilling fluid is being lost. The high concentration of granular particles serves to plug the formation and prevent loss of circulation thereinto.

10 Claims, No Drawings

LOST CIRCULATION CONTROL

BACKGROUND OF THE INVENTION

This invention relates to the drilling of a well into the earth and more particularly to controlling the loss of drilling fluid into subterranean formations penetrated by the well.

In the drilling of a well into the earth by rotary drilling techniques, conventionally a drilling fluid is circulated from the surface of the earth down a drill string having a drill bit on the lower end thereof and through ports provided in the drill bit to the well bottom and thence back to the surface through the annulus formed about the drill string. Commonly, drilling fluids are employed that are either oil or water base. These fluids are treated to provide desired rheological properties which make the fluids particularly useful in the drilling of wells.

A problem often encountered in the drilling of a well is the loss of unacceptably large amounts of drilling fluid into subterranean formations penetrated by the well. This problem is often referred to generally as "lost circulation" and the formations into which the drilling fluid is lost are often referred to as "lost circulation zones" or "thief zones." Various causes may be responsible for the lost circulation encountered in the drilling of a well. For example, a formation penetrated by the well may exhibit unusually high permeability or may contain fractures or crevices therein. In addition, a formation may simply not be sufficiently competent to support the hydrostatic pressure applied by the drilling fluid and may break down under this hydrostatic pressure and allow the drilling fluid to flow thereinto.

Numerous techniques have been developed to control lost circulation. One common technique involves increasing the viscosity of the drilling fluid to increase its resistance to flow into the formation. Another technique involves the addition of bulk material, such as cottonseed hulls, sawdust, or ground walnut shells to the drilling fluid. In addition, asphaltic materials including gilsonite have been added to both water base and oil base fluids to prevent the loss of drilling fluid from the well into surrounding formations. For example, in U.S. Pat. No. 2,773,670 to Miller, there is taught a method of stopping lost circulation by including in drilling fluids asphaltic materials, particularly either natural or air-blown asphalts having certain properties. These materials are added in the form of discrete particles to the drilling fluid and are suspended as such in the fluid where they are carried down the drill pipe and thence into the annulus between the pipe and the well and to the lost circulation zone. Upon reaching the lost circulation zone, due in part to at least the elevated temperatures and pressures found in the well, the asphalt particles attach themselves to the formation and are fused or bonded together and to the formation structure to form an effective seal against the passage of drilling fluid into the formation.

The use of gilsonite in suitable granular form in an aqueous carrier liquid for stopping losses of circulation is taught in U.S. Pat. No. 2,812,161 to Mayhew. The granules of gilsonite are simply mixed with a portion of aqueous drilling mud and pumped into the hole so that the mud will carry the gilsonite granules to the leaking strata and force them into the crevices therein. In accordance with Mayhew the effective concentration of the granular gilsonite in the aqueous liquid carrier ranges from as little as 10 pounds up to 50 pounds per barrel of the mixture for most common cases of lost circulation and for severe conditions this concentration may be increased to as much as 100 pounds per barrel. In U.S. Pat. No. 2,573,690 to Cardwell et al. there is described a method of treating earth formations wherein there is used in conjunction with an earth consolidated resin-forming liquid mixture, a filler which is a solid substance in granular form in two ranges of particle size, one being coarse and corresponding in size to the channel fissures and cracks, the other comparatively fine and corresponding in size to the particles of the formation to be consolidated. Among those substances to be used as a filler are walnut shells, pecan shells, cocoanut shells, and gilsonite.

Other granular materials used in the preventing of loss of fluid into formations include coal and coke. For example, in U.S. Pat. No. 2,650,195 to Cardwell et al., there is disclosed a method of preventing the loss of fluid into formations by providing a cohesive resinous coating upon filterable inert solid particles which are added to the fluid so as to form a filter cake of self-bonding particles when a thief zone is encountered. Various filler materials which may be used include coke, coal, cinders, and nut shells.

SUMMARY OF THE INVENTION

This invention is directed to a method of alleviating drilling fluid loss into a subterranean formation that is penetrated in the drilling of a well. An aqueous mixture of an emulsifying agent and preferentially oil-wettable granular particles in an amount greater than 100 pounds per barrel of mixture is introduced into the well. This mixture is circulated down the well and into the formation into which the drilling fluid is lost. Ground coal and asphaltic materials are preferentially oil-wettable granular particles which are used in carrying out embodiments of this invention.

In another embodiment an emulsifying agent which is used is selected from the class of polyoxyethylene-aryl ethers of the structural formula

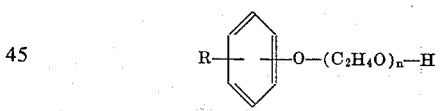

wherein
R is a hydrogen atom or an aliphatic substituent having no more than nine carbon atoms, and
n is an integer within the range of 10 to 100.

DESCRIPTION OF THE PREFERRED EMBODIMENTS

The present invention provides a method of controlling severe lost circulation problems which may be encountered when drilling a well with either oil base or water base drilling fluids. This method has particular application in controlling lost circulation when drilling with oil base fluids and is hereafter described with reference to use with such fluids. It is to be understood, however, that it is also applicable for use in controlling lost circulation when drilling with water base fluids.

In accordance with this invention an aqueous mixture of an emulsifying agent and a high concentration of preferentially oil-wettable granular particles is injected into a well experiencing severe lost circulation problems. This mixture is circulated down the well and into the lost circulation zone where the granular particles are deposited to seal the zone and thereby control the loss of drilling fluid into the formation.

Best results are obtained in treating wells to control severe lost circulation problems experienced in the drilling of a well with an oil base drilling fluid by injecting into the lost circulation zone a high concentration of granular particles. This concentration of granular particles should be greater than 100 pounds per barrel of mixture injected into the lost circulation zone and in cases of very severe lost circulation a concentration of up to 300 pounds per barrel is desirable. Heretofore it has not been possible to employ such high concentrations of granular materials in controlling lost circulation because of the problems involved in preparing such a mixture which is both pumpable and stable. By stable is meant that the granular particles will not settle out of the mixture in any appreciable amount while the mixture is circulated down the well to the lost circulation zone.

I have discovered that a pumpable and stable mixture containing more than 100 pounds of granular particles per barrel of mixture can be obtained by mixing an emulsifying agent and preferentially oil-wettable granular particles in an aqueous carrier liquid. It is thought that the emulsifying agent covers the preferentially oil-wettable granular particles and that water adheres to this covering thereby forming a water-wet globule. This covering is not thought to change the surface characteristics of the particles and may be removed by vigorous washing in such fluids as oil or water. These water-wet globules are more easily suspended in the aqueous carrier liquid than the uncovered preferentially oil-wettable particles, thereby facilitating the suspension of high concentrations of such particles in the aqueous carrier liquid.

In accordance with an embodiment of this invention an aqueous mixture of preferentially oil-wettable granular particles in an amount greater than 100 pounds per barrel of mixture, and an emulsifying agent is injected as a slug into a well experiencing severe lost circulation problems and displaced down the well and into the lost circulation zone to bridge this zone and provide a seal to prevent the further loss of drilling fluid thereinto. Preferentially oil-wettable granular materials found to be desirable for use in carrying out this invention are asphaltic materials, in particular gilsonite, and ground coal. Gilsonite is a natural asphalt which has a specific gravity of 1.05 - 1.10 (77° F.) and a hardness (Mohs scale) of 2. Granular particles of the asphaltic materials typified by gilsonite and ground coal are irregularly shaped and contain rough edges. These irregular shapes and rough edges aid in forming a good bridge in the lost circulation zone. It is also helpful in forming a good bridge to employ variable size particles, the larger size being at least as large as the fracture openings that may exist in the lost circulation zone and the finer size being of a size which may be thought of as a powder. In terms of mesh size, the particles would normally fall within the range of 4 to 200 mesh.

The ground coal is inert in oil whereas the gilsonite in oil exhibits the properties of first swelling, then softening, and finally dissolving. The properties of both gilsonite and ground coal make them each desirable as bridging materials under certain conditions and also make a mixture of them desirable under certain conditions. The swelling properties of gilsonite cause the particles deposited in the lost circulation zone to swell, thereby forming a tighter seal. Ground coal which is more rigid than gilsonite may be included with the gilsonite as a bridging agent. The swelling property of the gilsonite tends to lock the ground coal and gilsonite into a mat which is effective as a seal for the lost circulation zone. Various mixtures of ground coal and gilsonite may be used as a bridging agent but a particularly good mixture for use in bridging some lost circulation zones is obtained by mixing about two parts of ground coal with one part of gilsonite.

In high temperature lost circulation zones gilsonite tends to soften and form a less strong seal than in lower temperature zones. In such high temperature zones it is desirable to use a greater amount of ground coal in a coal-gilsonite mixture or even to use coal alone as a bridging agent.

In accordance with another embodiment of this invention, an aqueous mixture of an emulsifying agent and more than 100 pounds per barrel of mixture of asphaltic materials, which materials are of at least two general particle sizes, fine-ground particles and larger granular particles, such particles generally falling with the range of 200 to 4 mesh is injected down the well and into the vicinity of the lost circulation zone. Simultaneously pressure is applied to the oil base drilling fluid in the well to mix the aqueous mixture with the oil base drilling fluid and form a combined mixture. The combined mixture is forced into the subterranean formation to control the loss of the drilling fluid thereinto. This embodiment is usually carried out in the field by injecting the aqueous mixture down a drill pipe located in the well and into the vicinity of the lost circulation zone and simultaneously applying pressure to the annulus and forcing the oil base drilling fluid located thereinto to mix with the aqueous mixture and forcing both into the lost circulation zone. The mixing of the oil base drilling fluid with the asphaltic materials causes the asphaltic particles to expand. The fine-ground asphaltic particles expand more rapidly than the larger granular particles and result in the formation of a tight seal in the lost circulation zone. The reaction which normally follows the swelling of the asphaltic material is the dissolving of it by the oil. However, the tight seal excludes most of the oil from contact with the asphaltic material, thereby precluding any great amount of dissolving of it. The best ratio of the fine-ground asphaltic particles to the larger granular particles to use depends upon the particular lost circulation zone to be treated. However, normally the amount of fine-ground asphaltic particles to be included in the mixture is within the range of 10 to 30 percent of the total asphaltic materials used.

A class of emulsifying agents which can be used in carrying out this invention is the polyoxyethylene-aryl ethers of the structural formula:

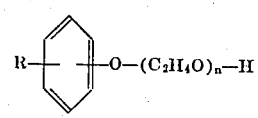

wherein
R is a hydrogen atom or an aliphatic substituent having no more than nine carbon atoms, and
$n$ is an integer within the range of 10 to 100.

Of these a preferred emulsifying agent is the material represented by the above-identified structural formula wherein R is a nonyl group and n is 30. This emulsifying agent is commonly known as a Drilling Mud Emulsifier or DME and should be used in an amount within the range of 0.5 to 5 pounds per barrel of mix and preferably within the range of 1 to 2 pounds per barrel of mix.

Other additives commonly used in treating drilling fluids may also be included in the aqueous mixture. For example, a dispersing agent, sometimes referred to as a thinning agent may be included to aid in controlling the viscosity to better provide a pumpable mixture. A dispersing agent is any suitable material which functions to promote and maintain separation of the individual granular particles within the aqueous mixture. Normally, the dispersing agent will be employed in an amount of up to 8 pounds per barrel and more often in an amount within the range of 2 to 4 pounds per barrel. A dispersing agent which gives particularly good results is ferrochrome lignosulfonate (FCL). A small amount of caustic may also be included to make the ferrochrome lignosulfonate more effective. Viscosifiers such as bentonite and attapulgite may be included in the mixture to aid in suspending the preferentially oil-wettable granular particles in the aqueous carrier liquid. Weighting material may also be employed to tailor the weight of the mixture.

Experimental data has been gathered in the laboratory, which data shows that a pumpable aqueous mixture containing more than 100 pounds of preferentially oil-wettable granular particles per barrel of mixture can be obtained by employing an emulsifying agent in the aqueous carrier liquid. This data is tabulated in the following Table. The convention of considering 350 cubic centimeters (cc.) and 1 gram (g.) to be equivalent to 1 barrel and 1 pound respectively has been followed in tabulating this data.

TABLE

|  | Composition in grams | Pounds per barrel based on original mud volume | Pounds per barrel of final mixture |
|---|---|---|---|
| Sample No. 1 |  |  |  |
| Water | 350 | 350 | 204 |
| Attapulgite | 5.0 | 5.0 | 2.92 |
| Caustic | 0.5 | 0.5 | 0.29 |
| FCL | 1.0 | 1.0 | 0.59 |
| DME | 2.6 | 2.6 | 1.52 |
| Gilsonite | 300 | 300 | 175 |
| Sample No. 2 |  |  |  |
| Water | 350 | 350 | 158 |
| Bentonite | 5.0 | 5.0 | 2.26 |
| Caustic | 0.5 | 0.5 | 0.23 |
| FCL | 2.0 | 2.0 | 0.90 |
| DME | — | — | — |
| Gilsonite | 430 | 430 | 194 |
| Sample No. 3 |  |  |  |
| Water | 158 | 158 | 133 |
| Bentonite | 2.26 | 2.26 | 1.91 |
| Caustic | 0.23 | 0.23 | 0.19 |
| FCL | 0.90 | 0.90 | 0.76 |
| DME | 2.0 | 2.0 | 1.86 |
| Gilsonite | 264 | 264 | 242 |

In carrying out these experiments, Sample No. 2 was prepared without including an emulsifying agent. This sample containing an equivalent of 194 pounds of gilsonite per barrel of mixture was not pumpable. A portion of this Sample No. 2 was then selected as the basis of Sample No. 3. There was added to this portion 2.0 grams of DME. The addition of the DME so changed the characteristics of this portion that it became clearly pumpable. Thereafter, an additional 70 grams of gilsonite were added to this portion to arrive at Sample No. 3 which contained an equivalent of 242 pounds of gilsonite per barrel of mixture. Sample No. 3 containing this high concentration of gilsonite was pumpable. Even a larger amount of gilsonite could have been added in forming Sample No. 3 without rendering the sample unpumpable.

I claim:

1. In the drilling of a well, the method of alleviating drilling fluid loss into a lost circulation zone of a subterranean formation penetrated by said well, comprising:

introducing a slug of an aqueous mixture of an emulsifying agent and preferentially oil-wettable granular particles of a size sufficiently large to permit said mixture to bridge the lost circulation zone and in an amount greater than 100 pounds per barrel of said mixture into said well; and circulating said slug down said well and into said lost circulation zone of said formation into which said drilling fluid is lost.

2. The method of claim 1 wherein said preferentially oil-wettable granular particles are selected from the group consisting of asphaltic material, ground coal, and mixtures thereof.

3. The method of claim 2 wherein said asphaltic material is gilsonite.

4. The method of claim 2 wherein said emulsifying agent is selected from the class of polyoxyethylene-aryl ethers of the structural formula:

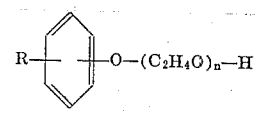

wherein

R is a hydrogen atom or an aliphatic substituent having no more than nine carbon atoms, and n is an integer within the range of 10 to 100.

5. In the method of claim 4 the emulsifying agent wherein R is a nonyl group and n is 30, said emulsifying agent being present in an amount within the range of 0.5 to 5.0 pounds per barrel of mixture.

6. The method of claim 5 wherein said aqueous mixture further includes a dispersing agent in an amount of up to 8 pounds per barrel of mixture.

7. The method of claim 6 wherein said dispersing agent is ferrochrome lignosulfonate.

8. In the drilling of a well with an oil base drilling fluid, the method of alleviating loss of said drilling fluid into a lost circulation zone of a subterranean formation penetrated by said well, comprising:

introducing into said well a slug of an aqueous mixture of an emulsifying agent, a dispersing agent, and granular asphaltic material in an amount greater than 100 pounds per barrel of said mixture;

circulating said slug down said well and into the vicinity of said lost circulation zone;

mixing said slug with said oil base drilling fluid in the vicinity of said lost circulation zone to form a combined mixture; and forcing said combined mixture into said lost circulation zone to bridge said lost circulation zone of said subterranean formation into which said drilling fluid is lost.

9. The method of claim 8 wherein said asphaltic material is gilsonite.

10. The method of claim 9 wherein said gilsonite is present within a size range of 4 to 200 mesh.

* * * * *